United States Patent
Fong et al.

(10) Patent No.: US 8,451,896 B2
(45) Date of Patent: May 28, 2013

(54) METHOD AND APPARATUS FOR ADAPTIVE QUANTIZATION IN DIGITAL VIDEO CODING

(75) Inventors: Chi Keung Fong, Hong Kong (HK); Wai Kuen Cham, Hong Kong (HK); Ka Man Cheng, Hong Kong (HK); Yu Liu, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 736 days.

(21) Appl. No.: 12/581,316

(22) Filed: Oct. 19, 2009

(65) Prior Publication Data

US 2011/0090961 A1    Apr. 21, 2011

(51) Int. Cl.
*H04N 7/12* (2006.01)
*H04N 7/50* (2006.01)

(52) U.S. Cl.
CPC .................................... *H04N 7/50* (2013.01)
USPC .................................... 375/240.15

(58) Field of Classification Search
USPC .................................... 375/240.15
See application file for complete search history.

(56) References Cited

U.S. PATENT DOCUMENTS

| | | |
|---|---|---|
| 7,804,897 B1 * | 9/2010 | Pun et al. ................. 275/240.04 |
| 2006/0227868 A1 * | 10/2006 | Chen et al. ............... 375/240.03 |
| 2007/0160129 A1 * | 7/2007 | Fujisawa et al. ............. 375/240 |
| 2009/0316793 A1 * | 12/2009 | Yang et al. ............... 375/240.24 |
| 2010/0091864 A1 * | 4/2010 | Tada et al. ................ 375/240.16 |

OTHER PUBLICATIONS

W.K. Cham et al., Adaptive Block-size Transform for AVS-X, 24th AVS Meeting, Mar. 2008, AVS M2284, Audio Video coding Standard Workgroup of China.
X. Z. Zheng et al., Study on the mapping of quantization step of 4×4 transform and 8×8 transform in AVS-X Profile ABT platform, 23rd AVS Meeting, Dec. 2007, AVSs M2241, China.
Y. F. Wang et al., Technical solution for AVS adaptive blocksize coding, 24th AVS Meeting, Mar. 2008, AVS M2303, Audio Video coding Standard Workgroup of China.

* cited by examiner

*Primary Examiner* — Jay Patel
*Assistant Examiner* — Jessica Prince
(74) *Attorney, Agent, or Firm* — Ella Cheong Hong Kong; Sam T. Yip

(57) ABSTRACT

The invention relates to adjusting the quantization parameter in digital video coding. A shift value (QP Shift) is used to adjust the quantization parameter. The shift value is determined in a determining step 101. The video nature is determined and compared with a threshold in a comparing step 102 to adjust the shift value adaptively according to the frame type in an adjusting step 103. The shift value shifts the quantization parameter in a shifting step 104.

14 Claims, 2 Drawing Sheets

METHOD AND APPARATUS FOR ADAPTIVE QUANTIZATION IN DIGITAL VIDEO CODING

TECHNICAL FIELD

The claimed invention relates to video coding. More particularly, the claimed invention is to adaptively shift the quantization parameter for digital video coding.

SUMMARY

In digital video coding, quantization is required during encoding and dequantization is required during decoding. Quantization and dequantization are to determine the number of bits allocated to the transform coefficients in a digital video frame. The number of bits allocated is known to be quantization parameter (QP). In general, the value of the quantization parameter is fixed throughout the digital video coding.

However, a need to change the value of the quantization parameter has arisen under a number of circumstances. For example, the value of the quantization parameter needs to be changed if the transform size varies. The larger the transform size is, the larger the dynamic range of the transform coefficients will be. Therefore, more bits are required to allocate to the transform coefficients in order to maintain the video quality and thus the quantization parameters (QP) needs to be adjusted among different transform sizes. Such change in transform size happens in certain digital video coding standards, such as H.264, whereas Arbitrary Block-size Transform (ABT) is adopted to achieve better coding performance by allowing different macroblocks to select different transform sizes.

In order to adjust the quantization parameter, another parameter is introduced and is known as quantization parameter shift (QP shift). The value of the QP shift is adjusted adaptively according to the video nature as well as the frame type.

Video nature, such as motion speed of objects or scenes in the video, affects the performance of the motion estimation. If the motion estimation does not work well, for example, in fast-motion video, the average probability of the intra blocks in last P-frames will increase. Intra blocks refer to blocks which adopt intra prediction for video coding. Fewer bits will be allocated to the key frames, such as I-frames, but more bits will be allocated to the B-frames to improve the coding performance.

If the motion estimation works well, the average probability of the intra blocks in last P-frames will be less. In this case, a good reference frame is important and the coding performance is improved by allocating more bits to the key frames, such as I-frame but less to the B-frames. In the preferred embodiment, the average probability of the intra block in last P-frames is regarded as a measure of the video nature.

As a result, the coding performance is improved and the bit rate is reduced. Especially for the digital videos which motion estimation does not work well on, for example, those digital videos containing vigorous changes in motion or in intensity, the bit rate is significantly reduced. Furthermore, the only overhead is to store a QP shift value in every frame header. Such overhead is almost negligible and brings no cost for most digital videos.

It is an object of the claimed invention to adjust the number of bits allocated to a block during encoding and decoding.

It is a further object of the claimed invention to adjust the value of the QP shift in order to determine the value of the quantization parameter.

It is a further object of the claimed invention to adjust the value of the QP shift adaptively according to video nature with low computational load.

BRIEF DESCRIPTION OF THE DRAWINGS

These and other objects, aspects and embodiments of this claimed invention will be described hereinafter in more details with reference to the following drawings, in which:

DESCRIPTION

Figure 1:
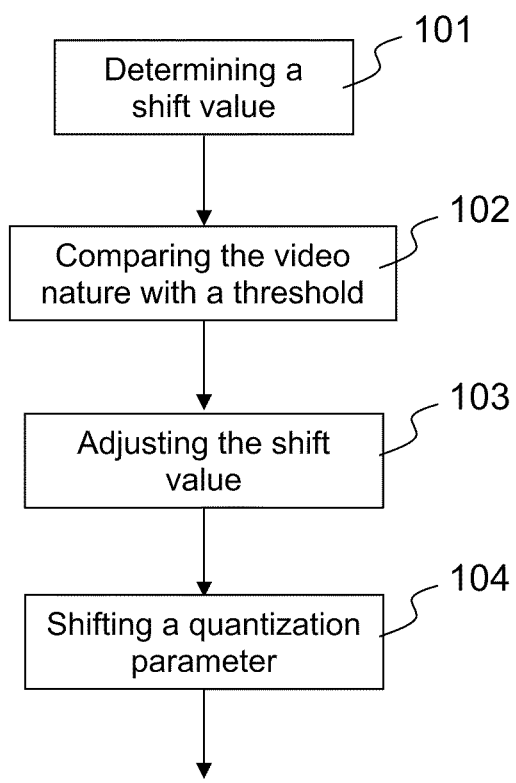
FIG. 1 shows a flow diagram illustrating the shifting of quantization parameter.

FIG. 1 shows a flow diagram illustrating shifting of quantization parameter. Different video coding methods adopt different macroblock sizes. For switching among different video coding methods, Arbitrary Block-size Transform is used to provide different transform sizes to avoid the mismatch error in transforms such as discrete cosine transform (DCT) and inverse discrete cosine transform (IDCT) during motion compensation. Different transform sizes need different levels of quantization which is determined by quantization parameters (QP). Therefore, in order to adjust the quantization parameters for different transform sizes, a parameter, QP Shift, is introduced to shift the quantization parameters. In an embodiment, the quantization parameter of transform size $8 \times 8$ ($QP_8$) is shifted by a QP Shift ($QP\_Shift_{16}$) into the quantization parameter of transform size $16 \times 16$ ($QP_{16}$) in a shifting step 104.

$$QP_{16} = QP_8 - QP\_Shift_{16} \qquad (1)$$

In another embodiment, the quantization parameter of transform size $8 \times 8$ ($QP_8$) is shifted by a QP Shift ($QP\_Shift_4$) into the quantization parameter of transform size $4 \times 4$ ($QP_4$).

$$QP_4 = QP_8 - QP\_Shift_4 \qquad (2)$$

In general, the quantization parameter of transform size m by m ($QP_m$) is shifted by a QP Shift ($QP\_Shift_n$) into the quantization parameter of transform size n by n ($QP_n$):

$$QP_n = QP_m - QP\_Shift_n \qquad (3)$$

The QP Shift ($QP\_Shift_n$) for shifting a quantization parameter of transform size m by m into a quantization parameter of transform size n by n is determined in a determining step 101.

In a preferred embodiment, the value of the QP Shift ($QP\_Shift_n$) is adjusted adaptively according to the video nature is an adjusting step 103. The video nature, for example, refers to how fast-changing the scene of a video is. In a video with a fast-changing scene or in some particular cases, motion compensation does not perform well in an inter-block way and intra-block motion compensation has to be used to improve the performance. The video nature is set to be the probability of the intra blocks in the previous P-frame $P_{intra}$. In a comparing step, if the average probability of the intra blocks in the previous P-frame $P_{intra}$ is over a threshold value, around 0.45, the value of the QP Shift ($QP\_Shift_n$) needs to be adjusted for different frame types and if such average probability is below the threshold value, the value of the QP Shift ($QP\_Shift_n$) is the fixed value as determined in the determining step 101.

Figure 2:
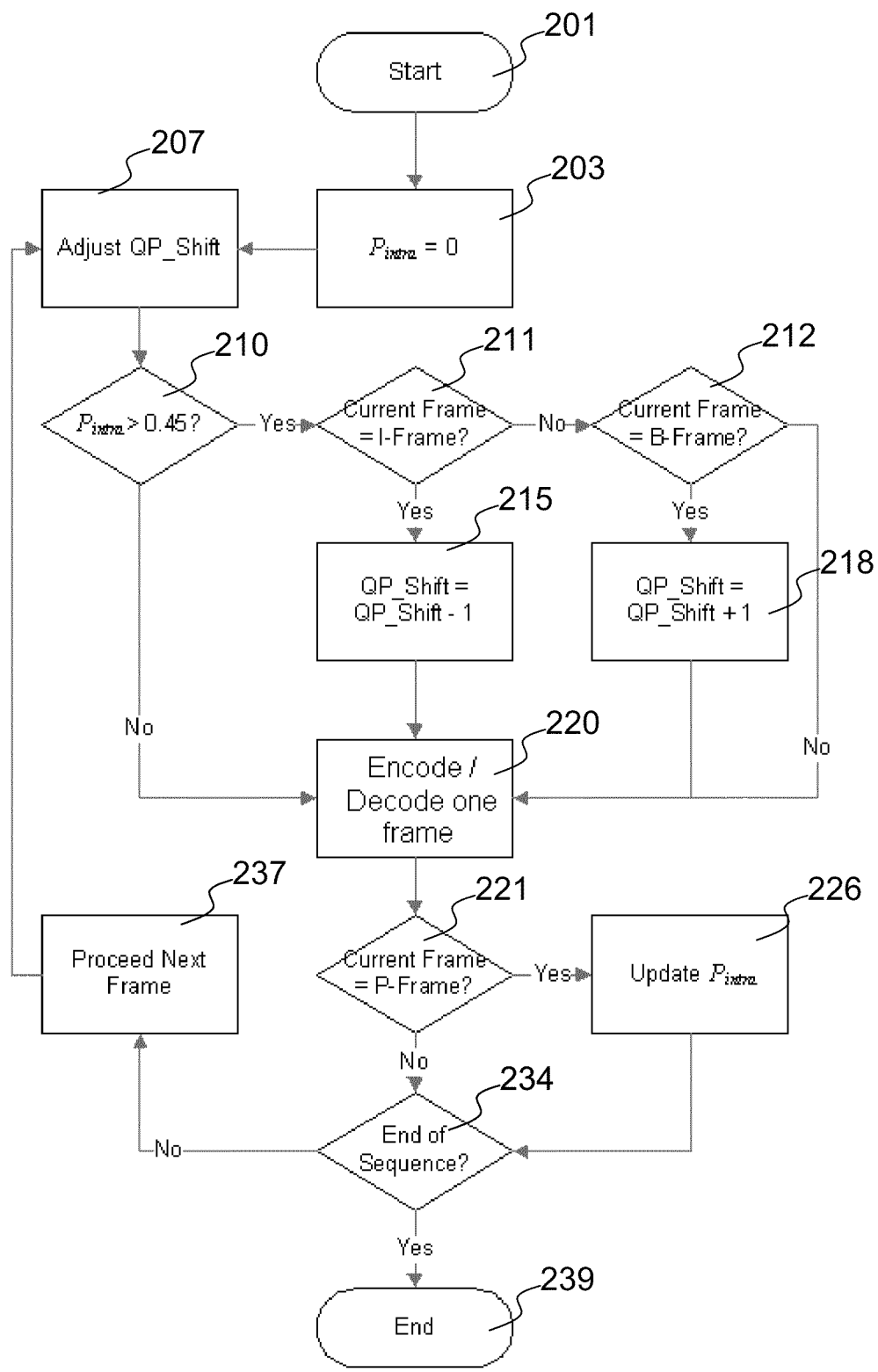
FIG. 2 shows a flow diagram illustrating how bit allocation is performed.

FIG. 2 shows the flow diagram illustrating an embodiment of how the value of the QP Shift ($QP\_Shift_n$) is adjusted.

A processor starts the process of shifting the quantization parameter for different transform sizes in different video coding methods through a starting step 201. The processor processes a digital video one digital video frame by one digital video frame. The digital video which is being processed by the processor for encoding or decoding is known as the current digital video frame. The quantization parameter is to be shifted by the QP shift as described in the above equation (3). In an initializing step 203, the video nature is initialized to a normal value under which the predetermined value of the QP Shift is adopted. For example, the average probability of the intra blocks in the previous P-frames ($P_{intra}$) is initialized to zero in the initialing step 203.

Subsequently, the QP Shift is adaptively adjusted through an adjusting step 207 to provide a better performance according to the video nature and the frame type. Whether the adjustment of the QP Shift value is needed depends on the video nature. For example, the video nature is determined by the average probability of the intra blocks in the previous P-frames ($P_{intra}$). The average probability of the intra blocks in the previous P-frames ($P_{intra}$) is compared with a threshold in a comparing step 210. The value of the threshold ranges from 0.3 to 0.6. In a preferred embodiment, the value of the threshold is 0.45. If the average probability of the intra blocks in the previous P-frames ($P_{intra}$) is higher than the threshold, the QP Shift is adjusted according to the frame type. If the average probability of the intra blocks in the previous P-frames ($P_{intra}$) is less than or equal to the threshold, the predetermined value of the QP Shift is adopted and the new quantization parameter is determined by the predetermined value of the QP Shift ($QP\_Shift_n$). Each predetermined value of the QP Shift ($QP\_Shift_n$) is indicated by a 4-bit flag in the frame header of every digital video frame. The QP Shift ($QP\_Shift_n$) represents for shifting a quantization parameter of one transform size m by m into a quantization parameter of another transform size n by n. In a preferred embodiment, the predetermined values of the QP Shift being stored include $QP\_Shift_4$ for shifting a quantization parameter of transform size 8 by 8 into a quantization parameter of a transform size 4 by 4 and $QP\_Shift_{16}$ for shifting a quantization parameter of transform size 8 by 8 into a quantization parameter of a transform size 16 by 16. The new quantization parameter is used for encoding/decoding one digital video frame in an encoding/decoding step 220.

To adjust the QP Shift according to the frame type, the current digital video frame is checked if it is an I-frame in a first checking step 211. If the current digital video frame is an I-frame, the QP Shift is decremented by one in a decrementing step 215. If the current digital video frame is not an I-frame, then the current digital video frame is checked if it is a B-frame in a second checking step 212. If the current digital video frame is a B-frame, the QP Shift $QP\ Shift_{16}$ is incremented by one in an incrementing step 218. If the current digital video frame is neither an I-frame nor a B-frame, then the predetermined value of the QP Shift is adopted and no adjustment of the QP Shift is required.

In a preferred embodiment, both the value of the QP Shift ($QP\_Shift_{16}$) for shifting the quantization parameter of transform size 8×8 ($QP_8$) into the quantization parameter of transform size 16×16 ($QP_{16}$) and the value of the QP Shift ($QP\_Shift_4$) for shifting the quantization parameter of transform size 8×8 ($QP_8$) into the quantization parameter of transform size 4×4 ($QP_4$) are indicated by two 4-bit flags in every frame header. The predetermined values of the QP Shift ($QP\_Shift_4$) and ($QP\_Shift_{16}$) are provided to enable the switching of transform size from 8×8 to 16×16 as well as 8×8 to 4×4. The more the switching of one transform size to another is required, the more flags are used to store the predetermined value of the QP Shift ($QP\_Shift_n$) in every frame header.

After completing the adjustment of the QP Shift, the new quantization parameter is determined by the adjusted or predetermined value of the QP Shift and is used for encoding/decoding one digital video frame in an encoding/decoding step 220.

After the encoding/decoding step 220, the current digital video frame is checked if it is a P-frame in a third checking step 221. If the current digital video frame is a P-frame, the average probability of the intra blocks in the previous P-frames ($P_{intra}$), is updated in an updating step 226 by checking whether intra blocks is used for motion compensation in the current digital video frame and computing a new value for the average probability of the intra blocks in the previous P-frames ($P_{intra}$).

After checking the current digital video frame to see if it is a P-frame, the current digital video frame is further checked to see if it is the last frame in a digital video sequence in a fourth checking step 234. If the current digital video frame is the last frame in a digital video sequence, the process of encoding continues with next frame in a proceeding step 237 to proceed to adjust the QP Shift for the next frame in a digital video sequence in the adjusting step 207. The whole process is iterated until the encoding of the digital video sequence has been completed.

The first checking step 211, the second checking step 212 and the third checking step 221 check the frame type by checking the header of the current digital video frame. The fourth checking step 234 also looks into the header of the current digital video frame to see if the current digital video frame is the last frame in a digital video sequence.

The description of embodiments of the invention are not exhaustive and any update or modifications to them are obvious to those skilled in the art, and therefore reference is made to the appending claims for determining the scope of the present invention.

INDUSTRIAL APPLICABILITY

The claimed invention is used for the implementation of adjusting quantization parameter adaptively for digital video coding, including encoding and decoding. Quantization parameter is adjusted adaptively according to video nature as well as frame types. In particular, the claimed invention is used for the implementation of arbitrary block-size transform (ABT). The claims invention is applicable to digital coding standards which may adopt arbitrary block-size transform, for example, H.264, Advanced Video Coding (AVC) and Audio Video Standard (AVS).

What is claimed is:

1. A digital video coding method being performed by a processor, comprising:
   determining a shift value according to nature of a digital video and frame type of a current digital video frame of the digital video;
   comparing the nature of the digital video with a threshold;
   checking the frame type of the current digital video frame of the digital video according to the nature of the digital video;
   decreasing or increasing the shift value according to the nature of the digital video in relative to the threshold, wherein the decreasing or increasing of the shift value comprising:
      decreasing the shift value for an I-frame when average probability of an Intra block in a previous P-frames is higher than the threshold; and
   shifting a quantization parameter of the digital video coding method by the shift value.

2. The digital video coding method according to claim 1, wherein the nature of the digital video is an average probability of Intra block in one or more previous P-frames.

3. The digital video coding method according to claim 2, wherein the threshold is 0.45.

4. The digital video coding method according to claim 2, wherein the decreasing or increasing of the shift value further comprising increasing the shift value for a B-frame when average probability of an Intra block in a previous P-frames is lower than the threshold.

5. The digital video coding method according to claim 1, wherein each frame header of the digital video contains a plurality of predetermined shift values for a plurality of transform sizes for the digital video coding method.

6. The digital video coding method according to claim 5, wherein the transform sizes are selected from a group consisting of 4 by 4 and 16 by 16.

7. A digital video coding method with adaptive quantization, comprising:
    comparing an average probability of Intra block in one or more previous P-frames with a threshold;
    checking frame types of a current digital video frame; and
    adjusting a quantization parameter shift according to the frame types, wherein the adjusting step comprises increasing or decreasing the quantization parameter shift according to the average probability in relative to the threshold, and wherein the increasing or decreasing of the quantization parameter shift comprises:
        decreasing the quantization parameter shift for an I-frame when the average probability of an Intra block in a previous P-frames is higher than the threshold.

8. The digital video coding method according to claim 7, wherein the threshold is 0.45.

9. The digital video coding method according to claim 7, wherein the increasing or decreasing of the quantization parameter shift comprises increasing the quantization parameter shift for a B-frame when the average probability of an Intra block in a previous P-frames is lower than the threshold.

10. The digital video coding method according to claim 7, wherein each frame header of the digital video contains a plurality of adjusted shift values for a plurality of transform sizes for the digital video coding.

11. The digital video coding method according to claim 10, wherein the transform sizes are selected from a group consisting of 4 by 4 and 16 by 16.

12. A digital video coding method being performed by a processor, comprising:
    determining a shift value according to an average probability of Intra block in one or more previous P-frames of a digital video and frame type of a current digital video frame of the digital video;
    comparing the average probability of the Intra block in the previous P-frames with a threshold;
    checking the frame type of the current digital video frame;
    adjusting the shift value according to the average probability of the Intra block in the previous P-frames, wherein the shift value for an I-frame being decreased when the average probability of the Intra block in the previous P-frames is higher than the threshold, and wherein the shift value for a B-frame being increased when the average probability of the Intra block in the previous P-frames is lower than the threshold; and
    shifting a quantization parameter of the digital video coding method by the shift value.

13. A digital video coding method being performed by a processor, comprising:
    determining a shift value according to nature of a digital video and frame type of a current digital video frame of the digital video;
    comparing the nature of the digital video with a threshold;
    checking the frame type of the current digital video frame of the digital video according to the nature of the digital video;
    decreasing or increasing the shift value according to the nature of the digital video in relative to the threshold, wherein the decreasing or increasing of the shift value comprising:
        increasing the shift value for a B-frame when average probability of an Intra block in a previous P-frames is lower than the threshold; and
    shifting a quantization parameter of the digital video coding method by the shift value.

14. The digital video coding method according to claim 13, wherein the decreasing or increasing of the shift value further comprising decreasing the shift value for an I-frame when average probability of an Intra block in a previous P-frames is higher than the threshold.

* * * * *